(12) United States Patent
Dukes et al.

(10) Patent No.: US 9,647,937 B1
(45) Date of Patent: *May 9, 2017

(54) POLICY CONTROL USING SOFTWARE DEFINED NETWORK (SDN) PROTOCOL

(71) Applicant: Juniper Networks, Inc., Sunnyvale, CA (US)

(72) Inventors: Mohini Dukes, Chelmsford, MA (US); Jerome P. Moisand, Arlington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,387

(22) Filed: Feb. 1, 2016

Related U.S. Application Data

(63) Continuation of application No. 13/723,177, filed on Dec. 20, 2012, now Pat. No. 9,252,972.

(51) Int. Cl.
| | | |
|---|---|---|
| *G06F 15/16* | (2006.01) | |
| *H04L 12/715* | (2013.01) | |
| *H04L 12/931* | (2013.01) | |
| *H04L 12/721* | (2013.01) | |

(52) U.S. Cl.
CPC .............. *H04L 45/64* (2013.01); *H04L 45/38* (2013.01); *H04L 49/351* (2013.01)

(58) Field of Classification Search
CPC .............................. H04L 12/569; H04L 49/70
USPC ........................................................ 709/224
See application file for complete search history.

(56) References Cited

U.S. PATENT DOCUMENTS

| | | |
|---|---|---|
| 6,976,154 B1 | 12/2005 | Dyckerhoff et al. |
| 7,813,376 B1 | 10/2010 | Gibbons et al. |
| 7,948,874 B2 * | 5/2011 | Tadimeti ................. H04L 45/22 370/228 |
| 8,112,800 B1 | 2/2012 | Yang et al. |
| 8,612,612 B1 | 12/2013 | Dukes et al. |
| 8,675,664 B1 * | 3/2014 | Kamath ................ H04L 12/287 370/395.5 |
| 9,003,057 B2 | 4/2015 | Mahaffey et al. |
| 2008/0133518 A1 | 6/2008 | Kapoor et al. |
| 2010/0095367 A1 | 4/2010 | Narayanaswamy |
| 2011/0080886 A1 | 4/2011 | Chandrachood et al. |
| 2012/0269167 A1 | 10/2012 | Velev et al. |
| 2013/0136091 A1 | 5/2013 | Ludwig et al. |
| 2013/0163426 A1 | 6/2013 | Beliveau et al. |

(Continued)

OTHER PUBLICATIONS

Control plane policing implementation best practices, http://www.cisco.com/web/about/security/intelligence, accessed Nov. 13, 2014.

(Continued)

*Primary Examiner* — Moustafa M Meky
*Assistant Examiner* — Thorne E Waugh
(74) *Attorney, Agent, or Firm* — Shumaker & Sieffert, P.A.

(57) ABSTRACT

A network device includes an internal policy engine that makes local policy decisions for packet flows and controls policies applied by service modules and forwarding components of the network device. The policy engine interacts with an external policy server to receive policies using software defined networking (SDN) protocol as if the data plane of the network device were directly exposed to the external policy server by the SDN protocol.

20 Claims, 5 Drawing Sheets

(56) References Cited

U.S. PATENT DOCUMENTS

2014/0126410 A1 5/2014 Agarwal et al.
2014/0301203 A1 10/2014 Kampmann et al.

OTHER PUBLICATIONS

McKeown et al., Open Flow: Enabling Innovation in campus networks, CM SIGNCOMM Computer Communication Review, vol. 38, No. 2, Apr. 2008.
Open Networking Foundation, Software-defined networking: the new norm for networks, Apr. 13, 2012.
Openflow Switch Specification, Version 1.1.0 Implemented (Wire Protocol Ox02), Feb. 28, 2011.
Pepelnjak, Ivan, Control and data plane, http://wiki.nil.com/Control_and_Data_plane, Sep. 17, 2010.
Lara et al., Simplifying network management using software defined networking and openflow, 2012 IEEE conference on advanced networks and telecommunicaitons systesm (ants), 2012, doi:1 0.11 09/ANTS.2012.6524222.
"Software-Defined Networking: The New Norm for Networks," ONF Open Network Foundation, Apr. 13, 2012, 12 pp.
3GPP TS 23.203 V10.1.0 (Sep. 2010), 3rd Generation Partnership Project; Technical Specification Group Services and System Aspects; Policy and charging control architecture (Release 10), Sep. 2010, 132 pp.
Wadhwa et al., "Protocol for Access Node Control Mechanism in Broadband Networks, draft-ietf-ancp-protocol-17," Network Working Group, Internet-Draft, Apr. 26, 2011, 82 pp.
"OpenFlow Switch Specification Version 1.2," Open Networking Foundation, Dec. 5, 2011, 83 pp.
U.S. Appl. No. 12/947,463, by Gazal Sahai, filed Nov. 16, 2010.
U.S. Appl. No. 13/174,437, by Balamurugan Ramaraj, filed Jun. 30, 2011.
U.S. Appl. No. 13/248,834, by Srinivasa Chaganti, filed Sep. 29, 2011.
U.S. Appl. No. 13/723,177, by Mohini Dukes, filed Dec. 20, 2012.
Prosecution History of U.S. Appl. No. 13/723,177 dated Jan. 9, 2015 through Jul. 21, 2015, 90 pgs.

* cited by examiner

POLICY CONTROL USING SOFTWARE DEFINED NETWORK (SDN) PROTOCOL

This application is a continuation of U.S. patent application Ser. No. 13/723,177, filed Dec. 20, 2012, the entire content of which is incorporated by reference herein.

TECHNICAL FIELD

The invention relates to computer networks and, more specifically, network devices that route packets within computer networks.

BACKGROUND

Various types of devices connect to service provider networks to access services provided by packet-based data networks, such as the Internet, enterprise intranets, and virtual private networks (VPNs). For example, many computers utilize fixed subscriber connections, such as digital subscriber line- or cable-based connections, of service provider networks to access the packet-based services. Similarly, wireless devices, such as cellular or mobile smart phones and feature phones, tablet computers, and laptop computers, utilize mobile connections such as cellular radio access networks of the service provider networks to access the packet-based services.

In this way, the service provider network typically provide an extensive access network infrastructure to provide packet-based data services to service provider network access gateways to provide access to the offered services. Access gateways, for example, are positioned near the edge of the service provider network upstream from the subscribers and typically provide an anchor for managing subscriber sessions. The access gateways typically provide mechanisms for identifying subscriber traffic and apply subscriber policies to manage subscriber traffic on a per-subscriber basis as such traffic traverses the service provider core network boundary.

The increased demand for data services has led to significant increase in size and complexity of fixed and wired access networks. Policy distribution and control within large-scale access networks is often a challenge given the sheer volume of subscribers and the wide variety of networking equipment that may be deployed within the access network.

SUMMARY

In general, techniques are described for leveraging software defined networks (SDNs) and protocols related thereto to provide a policy control framework that leverages existing network infrastructure to scale to the demand from increasing numbers of subscribers. The techniques may provide an automated solution that can provide network-level policy decisions yet provide granular per-flow policy control.

In one embodiment, a method comprises detecting, with a flow control unit of a data plane of a network device, a new packet flow and accessing, with a policy engine of a control plane of the network device, a plurality of policies stored within a policy database of the control plane of the network device to identify one or more of the policies that specify criteria that match attributes of the new packet flow. The method further comprises outputting, in response to failing to identify the one or more policies, a message to request a policy from a policy server. The message is constructed to conform to a software defined networking (SDN) protocol as if the data plane of the network device were directly exposed to an external device by the SDN protocol. The method further comprises receiving a response message that conforms to the SDN protocol and specifies at least one new policy and installing the policy within the policy database of the control plane of the network device.

In another embodiment, a network device comprises a plurality of interfaces configured to send and receive packets. The network device comprises a control plane and a data plane to forward packets between the interfaces, wherein the data plane includes a flow control unit to detect a new packet flow associated with the packets. The control plane comprises a routing engine to maintain routing information specifying routes through a network. The routing engine processes the routing information to select routes through the networks and install forwarding information within the data plane in accordance with the selected routes to control forwarding of the packets. The control plane also includes a policy engine that stores a plurality of policies stored within a policy database. In response to detection of the new packet flow, the policy engine outputs a message to request a policy from a policy server, the message constructed to conform to a software defined networking (SDN) protocol. The policy engine receives a response message from the policy server that specifies at least one new policy and installs the policy within the policy database of the control plane of the network device. The data plane may continue to forwarding packets in accordance with the forwarding information generated by the internal routing engine of the network device and in accordance with local policy decisions made by the policy engine, yet apply policies received from the policy server by the SDN protocol.

In another embodiment, a computer-readable medium contains instructions. The instructions cause a programmable processor to access, with a policy engine of a control plane of the network device, a plurality of policies stored within a policy database of the control plane of the network device to identify one or more of the policies that specify criteria that match attributes of a new packet flow. The instructions further cause the processor to output a message to request a policy from a policy server, wherein the message is constructed to conform to a software defined networking (SDN) protocol as if the data plane of the network device were directly exposed to an external device by the SDN protocol. The instructions further cause the processor to receive a response message from the policy server, wherein the response message conforms to the SDN protocol and specifies at least one new policy, install the policy within the policy database of the control plane of the network device, and, after receiving the response message and installing the policy within the policy database of the network device, execute a local policy decision with the policy engine of the network device to select one of the policies from the policy database for application to packets forwarded by the network device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
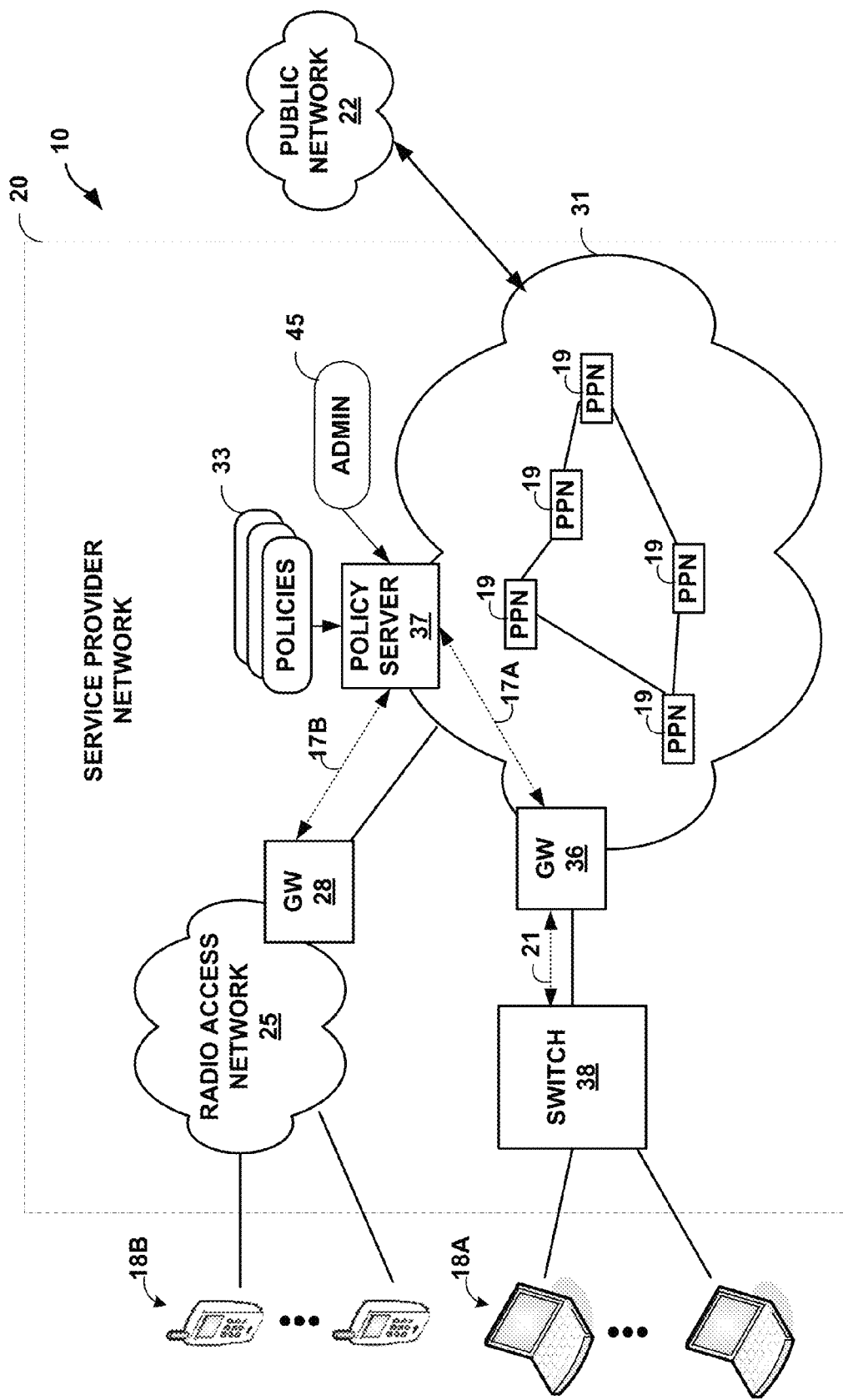
FIG. 1 is a block diagram illustrating an example network system that distributes and applies subscriber policies in accordance with techniques described herein.

FIG. 1 is a block diagram illustrating an example network system 2 that distributes and applies subscriber policies in accordance with techniques described herein. As shown in the example of FIG. 1, network system 10 includes a service provider network 20 coupled to a public network 22. Service provider network 20 operates as a private network that provides packet-based network services to subscriber devices 18A, 18B (herein, "subscriber devices 8"). Subscriber devices 18A may be, for example, personal computers, laptop computers or other types of computing device associated with subscribers. Subscriber devices 18B may comprise, for example, mobile telephones, laptop or desktop computers having, e.g., a 3G wireless card, wireless-capable netbooks, video game devices, pagers, smart phones, personal data assistants (PDAs) or the like. Each of subscriber devices 18 may run a variety of software applications, such as word processing and other office support software, web browsing software, software to support voice calls, video games, videoconferencing, and email, among others.

In the example of FIG. 1, service provider network 20 includes broadband network gateway (GW) 36 and network switch 38 that provide subscriber devices 18A with access to core network 31. In some embodiments, GW 36 may comprise a router that maintains routing information between subscriber devices 18A and core network 31. Broadband network gateway 36, for example, typically includes Broadband Remote Access Server (BRAS) functionality to aggregate output from one or more switches 38 into a higher-speed uplink to core network 31. Moreover, GW 36 provides an anchor point active sessions for subscriber devices 18A. In this sense, GW 36 may maintain session data and operate as a termination point for communication sessions established with subscriber devices 18A that are currently accessing packet-based services of public network via core network 31. That is, core network 31 provides data service access to public network 22 and may comprise, for instance, a general packet radio service (GPRS) core packet-switched network, a GPRS core circuit-switched network, an IP-based mobile multimedia core network, or another type of transport network. Core network 31 typically includes one or more packet processing nodes ("PPN") 19, such as internal routers and switches, and appliances to provide security services, load balancing, billing, deep-packet inspection (DPI), and other services for mobile traffic traversing the core network.

Network switch 38 may communicate with broadband network gateway 36 over a physical interface supporting various protocols, e.g., ATM interface supporting ATM protocols. In one example, network switch 38 may comprise a digital subscriber line access multiplexer (DSLAM) or other switching device. Each of subscriber devices 18A may utilize a Point-to-Point Protocol (PPP), such as PPP over ATM or PPP over Ethernet (PPPoE), to communicate with network switch 38. For example, using PPP, one of subscriber devices 18 may request access to core network 31 core network 31 and provide login information, such as a username and password, for authentication by policy server 37. PPP may be supported on lines such as digital subscriber lines (DSLs) that connect endpoint computing devices 18 with network switch 38. In other embodiments, endpoint computing devices 18 may utilize a non-PPP protocol to communicate with network switch 38. Other embodiments may use other lines besides DSL lines, such as cable, Ethernet over a T1, T3 or other access links. Examples details of a Broadband Remote Access Server coupled to a DSLAM or other network switch to provide manage network connections are described in U.S. Pat. No. 7,813,376, entitled "TERMINATION OF NETWORK CONNECTIONS IN ABSENCE OF A DYNAMIC NETWORK INTERFACE," the entire content of which is incorporated herein by reference.

As shown in FIG. 1, service provider network 20 may include radio access network 25 in which one or more base stations communicate via radio signals with subscriber devices 18B. Radio access network 25 is a transport network that enables base stations to exchange packetized data with core network 31 of the service provider, ultimately for communication with packet data network 22. Radio access network 25 typically comprises communication nodes interconnected by communication links, such as leased land-lines or point-to-point microwave connection. The communication nodes comprise network, aggregation, and switching elements that execute one or more protocols to route packets between base stations and gateway router ("GW") 28. Core network 31 provides session management, mobility management, and transport services to support access, by subscriber devices 18A, to public network 22. GW 28 provides an anchor point active sessions for subscriber devices 18B. Similar to GW 36, GW 28 may maintain session data and operate as a termination point for communication sessions established with subscriber devices 18B that are currently accessing packet-based services of public network via core network 31. Examples details of a high-end mobile gateway device that manages subscriber sessions for mobile devices are described in U.S. patent application Ser. No. 13/248,834, entitled MOBILE GATEWAY HAVING REDUCED FORWARDING STATE FOR ANCHORING MOBILE SUBSCRIBERS," the entire content of which is incorporated herein by reference.

Policy server 37 provides a central point for policy distribution and control for managing subscriber session associated with subscriber devices 18. For example, policy server 37 may be Policy Control and Charging Rules Function (PCRF) device that maintains a central database of policies 33 for deployment within service provider network 20 to be applied to packet flows for subscriber devices 18. In some examples, policy server 37 may also provide authentication, authorization and accounting (AAA) functions to authenticate the credentials of a subscriber requesting a network connection. Example details of a regarding policy and charging control are found in "3GPP TS 23.203—Policy and Charging Control Architecture (Release 10)," Version 10.1.0, 3rd Generation Partnership Project, Technical Specification Group Services and System Aspects, September 2010, which is incorporated herein by reference in its entirety. Although shown as a standalone device, policy server 37 may be integrated within a router or gateway of broadband network or on a separate network device and may be, for example, a Remote Authentication Dial-In User Service (RADIUS) server.

After authentication and establishment of network access, any one of subscriber devices 18 may begin exchanging data packets with public network 22, and such packets traverse GWs 28, 36 and PPNs 19. When forwarding packets, GWs 28, 36 and PPNs 19 may apply one or more policies to the packets. Upon receiving detecting a session request from one of subscriber devices 18A, GW 36 utilizes a communication session 17A with policy server 37 to authenticate the individual subscriber. At this time, GW 36 typically receives profile information for a subscriber and/or subscriber service identified in the request, where the profile information may specify particular policies to be applied to the packet flow(s) for the subscriber. As further described below, a local policy engine within a control plane of GW 36 installs the policies within a data plane of the BGW for application to the packet flows. Further, GW 36 controls application of policies to individual packet flows from subscriber devices 18A and may, on a per flow basis, interact with policy server 37 to retrieve policy information.

Similarly, GW 28 establishes a communication session 17B with policy server 37 to authenticate requests for new sessions from subscriber devices 18B and install policies within a data plane of GW 28 for application to the packet flows for the subscriber session. BGW 28 controls application of policies to individual packet flows from subscriber devices 18A and may, on a per flow basis, interact with policy server 37 to retrieve policy information.

Policies 33 may, for example, provide fine-grain control by way of service data flow (SDF) detection, QoS, gating and packet flow-based charging. Policies related to service data flow detection may contain information for identifying individual packet flows for a service session. In some examples, policies 33 specify one or more conditions and a set of actions to be performed on packets that match parameters that characterize packet flows according to, for example, the IP 5-tuple consisting of the source address, destination address, source port, destination port, and transport protocol specified in IP packet headers, other packet header information, and/or information obtained from Deep-Packet Inspection (DPI). The actions may include one or more of appending a label to the packet, removing or swapping a label on the packet, inspecting the packet for viruses, performing deep packet inspection on the packet, performing quality of service.

In this way, GWs 28, 36 provide an infrastructure for automated deployment of a rich set of policies that provide fine-grain, flow-level control over packet flows associated with subscribers 18. However, instead of a using conventional protocol when interacting with policy server 37, GWs 28, 36 may instead use a software defined networking (SDN) protocol. For example, instead of utilizing a conventional AAA protocol for authenticating subscribers with policy server 37, local policy engine within GWs 28, 36 uses an SDN protocol that is conventionally used to expose a forwarding plane of a network device to direct access by an external controller for creating and controlling a software defined network. In other words, rather than directly exposing the data planes of GWs 28, 36, the gateways utilize the SDN protocol in limited fashion for communication sessions 17A, 17B in place of conventional AAA protocols, such as Radius or Diameter. Moreover, GWs 28, 26 continue to maintain full control plane operation over packet forwarding function yet utilize an SDN protocol that has been extended so as to be used as a fine-grain policy distribution mechanism on a per flow basis.

More specifically, a software defined network (SDN) is a network in which control plane functionality is completely and entirely decoupled from data plane operation performed by switches and routers within the network. That is, control plane functionality within each of the devices is set aside and, instead, each device executes an SDN protocol to directly expose the data plane components of the device. Separate network equipment, such as a centralized SDN controller, performs all network control, including topology learning and forwarding decisions, and directly manipulates the data plane forwarding components of the network devices using the SDN protocol. One primary example of an SDN protocol is "OpenFlow," which is a layer two (L2) communication protocol that provides direct access to the data plane of a network switch or router. Further example details of the OpenFlow protocol is described in "OpenFlow Switch Specification," Open Networking Foundation, Version 1.2, Dec. 5, 2011, incorporated herein by reference.

In contrast, as further described below, GWs 28, 36 maintain full control plane operation over forwarding packet flows associated with subscribers 18. GWs 28, 36 and policy server 37 each include modified communication software that embeds functionality for an SDN protocol. That is, AAA communication software executing on GWs 28, 36 and policy server 37 utilizes an underlying SDN protocol that has been extended so as to be used as a fine-grain policy distribution mechanism capable of deploying and installing policies 33 on a per flow basis via communication sessions 17.

As a result, the techniques leverage internal policy control mechanisms of the existing network infrastructure, e.g., GWs 28, 36, to provide a policy distribution architecture able to scale to the demand from increasing numbers of subscribers 18. That is, as high-end network gateways, GWs 28, 36 may include tightly-coupled control-plane and data-plane policy enforcement mechanism suitable for high-volume networks. Conventional use of an SDN protocol to bypass control-plane functionality of GWs 28, 36 by directly exposing data plane components of the devices would likewise bypass these existing internal policy enforcement mechanisms of GWs 28, 36 or otherwise be unable to leverage such mechanisms. However, as further described, GWs 28, 36 maintain full control-plane functionality and control over their respective data planes yet nevertheless present an SDN protocol for receipt of policies to be deployed by the gateways as if their forwarding planes were exposed. This may be advantageous in that policy server 37 may conform to and otherwise communicate in accordance with technologies for software defined networks, which has ever increasing interest from industry and academia, yet allow service provider network 20 to utilize powerful policy enforcement mechanism within control planes of GWs 28, 36. In this way, the techniques described herein may provide an automated solution that can provide network-level policy control from one or more central devices, such as Policy server 37 using SDN protocols, yet provide granular per-flow policy control within each of GWs 28, 36. Although described by way of example with respect to GWs, 28, 36, PPNs 19 operate in accordance with the techniques described herein with respect to distribution of policies 33 from policy server 37.

Further, in some examples, GWs 28, 36 and/or PPNs 19 may utilize existing mechanisms to control other devices in accordance with the policies received from policy server 37. For example, GW 36 may utilize an access node control protocol (ANCP), also referred to as a layer two (L2) control protocol (L2CP), to establish communication session 21 with switch 38 and communicate control information to the switch in accordance with the policies received from policy server 37. Example details of an ANCP are described in "Protocol for Access Node Control Mechanism in Broadband Networks," Internet Engineering Task Force (IETF), Apr. 26, 2011, the entire contents of which are incorporated herein by reference.

Figure 2:
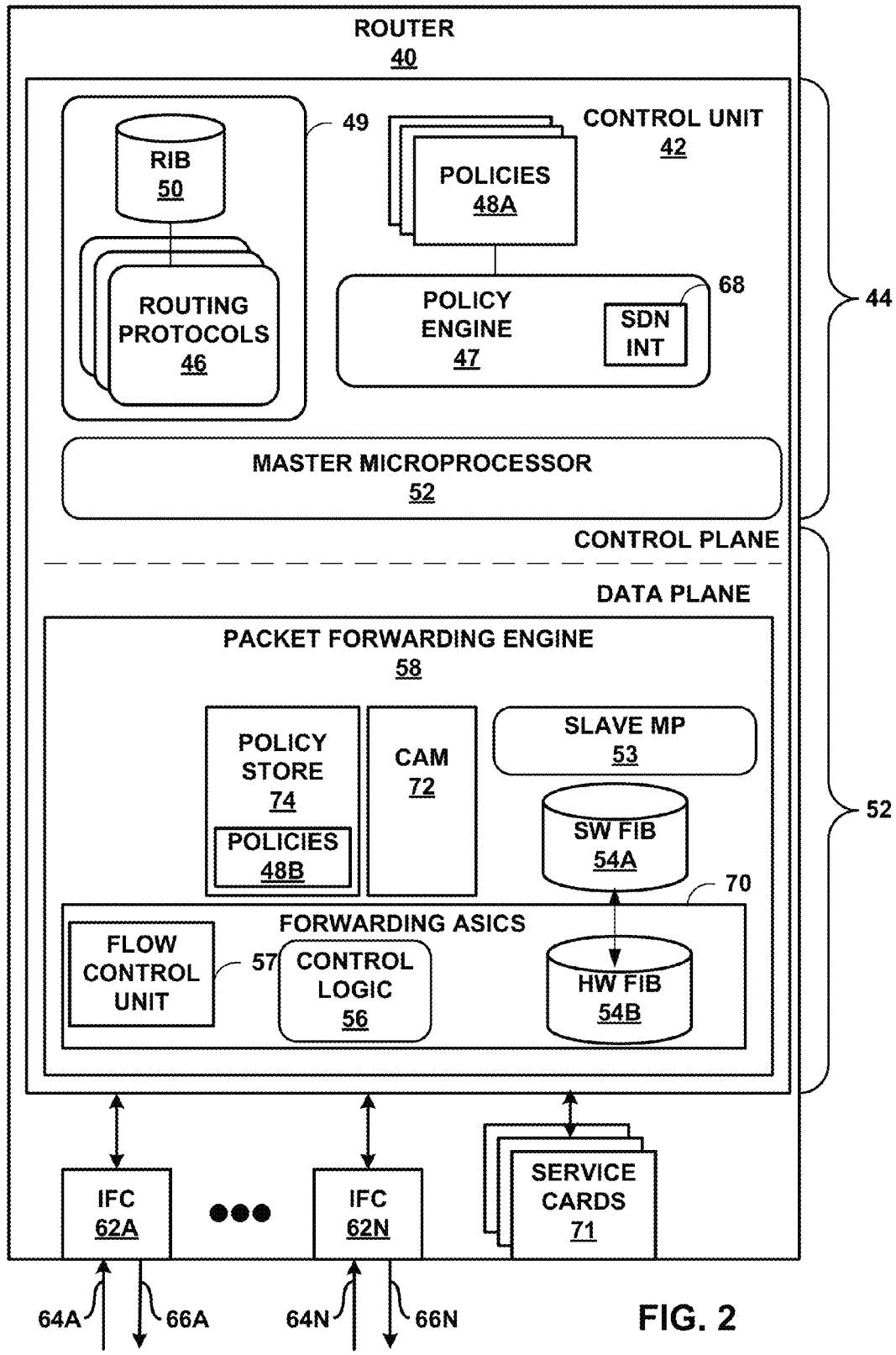
FIG. 2 is a block diagram illustrating an example router that is configured in accordance with one or more techniques of this disclosure.

FIG. 2 is a block diagram illustrating an example router 40 that is configured in accordance with one or more techniques of this disclosure. For purposes of illustration, router 40 may be described below within the context of system 10 shown in the example of FIG. 1 and may represent any one of gateways 28, 36, or any of PPNs 19. In this example embodiment, router 40 includes control unit 42, interface cards (IFCs) 62A-62N (collectively, "IFCs 62"), and service cards 71.

Router 40 typically include a chassis (not shown in the example of FIG. 2 for ease of illustration purposes) having a number of slots for receiving a set of cards, including IFCs 62 and service cards 71. Each card may be inserted into a corresponding slot of a chassis for communicably coupling the card to a control unit 42 via a bus, backplane, or other electrical communication mechanism. IFCs 62 send and receive packet flows or network traffic via inbound network links 64A-64N (collectively, "inbound links 64") and outbound network links 66A-66N (collectively, "outbound links 66"). Inbound links 64 and outbound links 66 in some examples for common IFCs form common, physical communication media for the IFCs, which operate in full duplex mode. That is, in some examples, each of IFCs 62 is coupled to respective communication media that can send and receive data substantially simultaneously. In other examples, inbound links 64 and outbound links 66 form separate physical media for respective IFCs 62.

Control unit 42 may include one or more master microprocessors 52 that execute software instructions, such as those used to define a software or computer program, stored to a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 42 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Figure 3:
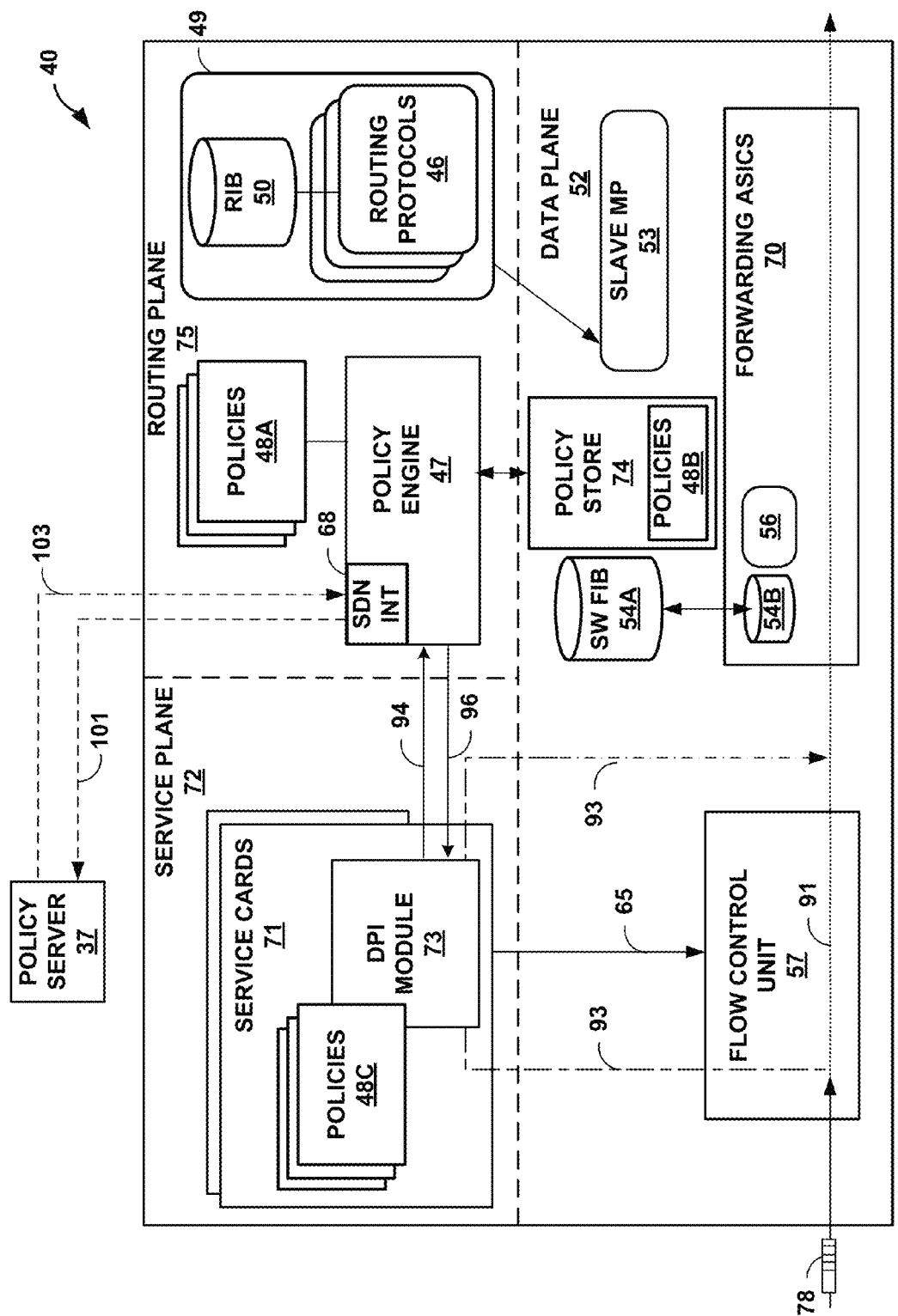
FIG. 3 is a block diagram illustrating example operation of the components of the router of FIG. 2, where the components are illustrated as operating within three different planes.

Control unit 42 may also be divided into logical or physical "planes" to include a control plane 44 and a forwarding plane 52. In some examples, control unit 42 may be further divided into a third logical or physical "plane," a service plane, as shown in FIG. 3. That is, control unit 42 may implement three separate functionalities, e.g., the routing, forwarding and service functionalities, either logically, e.g., as separate software instances executing on the same set of hardware components, physically, e.g., as separate physical dedicated hardware components that either statically implement the functionality in hardware or dynamically execute software or a computer program to implement the functionality, or some combination of logical and physical implementations.

Control plane 44 of control unit 42 provides the routing functionality of router 40. In this respect, control plane 44 may represent hardware or a combination of hardware and software of control unit 42 that implements routing protocols 46. Routing protocols 46 may include, for example, intermediate system to intermediate system (IS-IS), open shortest path first (OSPF), routing information protocol (RIP), border gateway protocol (BGP), or other routing protocols. By executing routing protocols 46, control plane 44 learns network topology and performs route selection for forwarding packets through the network and determines new routes through the network. That is routing protocols 46 may be part of a routing engine within control plane 44 and locally perform topology learning and forwarding decisions. Control plane 44 stores learned routing information within routing information base (RIB) 50. The routing information may include information defining a topology of a network, such as network 14 of FIG. 1. Control plane 44 generates forwarding information for data plane 52 by resolving the topology defined by the routing information to select or determine one or more routes through network 14. Control plane 44 may then update data plane 52 in accordance with these routes to program data plane 52 with forwarding information as a software forwarding information base (FIB) 54A.

In this example, data plane 52 includes a packet forwarding engine 58 that further includes slave microprocessor 53, content addressable memory (CAM) 72, and forwarding application-specific integrated circuits (ASICs) 70. Forwarding ASICs 70 may be microcode-controlled chipsets that are programmably configured by slave microprocessor 53. Specifically, one or more of ASICs 70 may be operable by internal microcode-based control logic 56 programmed by slave microprocessor 53. Further, slave microprocessor 53 programs a hardware FIB 54B into internal memory of ASICs 70 within the data plane 50A based on software FIB 54A. When forwarding packets, control logic 56 traverses HW FIB 54B and, upon reaching a FIB entry for the packet (e.g., a leaf node), microcode-implemented control logic 56 selects a forwarding next hop (FNH) for forwarding the packet. In this way, after the ASICs 70 are programmed with HW FIB 54B, data planes 52 of router 40 may receive and forward packet flows associated with subscribers 8. One example of a router including a packet processing engine having multiple microcode instruction memories is described in U.S. Pat. No. 6,976,154, the entire contents of which are incorporated herein by reference.

Service cards 71 may each represent a card capable of applying one or more services. Service card 71 may include a control unit, which may represent one or more general processors that execute software instructions, such as those used to define a software or computer program, stored to a non-transitory computer-readable medium, such as a storage device (e.g., a disk drive, or an optical drive), or memory (such as Flash memory, random access memory or RAM) or any other type of volatile or non-volatile memory, that stores instructions to cause the one or more processors to perform the techniques described herein. Alternatively, the control unit may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. In some instances, control unit 50 may be referred to as a processor.

When forwarding packets via, data plane 52 may apply one or more policies to the packets. For example, local policy engine 47 processes session requests received from subscriber devices 18 and interacts with policy server 37 to authenticate each subscriber. As shown in FIG. 2, policy engine includes SDN interface 68 to receive policies to be applied to particular packet flows for subscribers 18. Instead of utilizing a conventional AAA protocol for authenticating subscribers with policy server 37, SDN interface 68 uses an SDN protocol that is typically used for creating and controlling a software defined network by exposing data plane 52 and forwarding ASICs 70 to an external SDN controller.

In the example router 40 of FIG. 2, local policy engine 47 stores policies received via SDN interface 68 to an internal database or other repository as policies 48A and dynamically communicates with directs master processor 52 to install copies of policies 48B within data plane 52 for particular packet flows detected by forwarding ASICs 70. As further explained with respect to FIG. 3, flow control unit 57 of forwarding ASICs may detect new packet flow of new or existing sessions and may signal policy engine 47 of control plane 44, causing the policy engine to deploy policies, including potentially interacting with policy server 37, on a per flow basis.

Policies 48A, 48B may, for example, provide fine-grain control by way of service data flow (SDF) detection, QoS, gating and packet flow-based charging. Policies related to service data flow detection may contain information for identifying individual packet flows for a service session. In some examples, policies 48A, 48B specify one or more conditions and a set of actions to be performed on packets that match parameters that characterize packet flows according to, for example, the IP 5-tuple consisting of the source address, destination address, source port, destination port, and transport protocol specified in IP packet headers, other packet header information, and/or information obtained from Deep-Packet Inspection (DPI). The actions may include one or more of appending a label to the packet, removing or swapping a label on the packet, inspecting the packet for viruses, performing deep packet inspection on the packet, performing quality of service processing on the packet, blocking or dropping the packet or other services.

When installed within data plane 52, slave microprocessor 53 may store policies 48B within a policy store 74. Policy store 74 may be any suitable data structure to store policies 48A such as a database, lookup table, array, linked list, and the like, within a computer-readable medium. In this example, CAM 72 is used to store pointers that identify policies 48B, although any other type of readable memory structure may be used. CAM 72 comprises semiconductor memory and comparison circuitry that enables a search operation of contents in memory to complete in a single clock cycle. In one example, CAM 72 may store one or more entries comprising encoded values associated with one or more policies. To select one or more one or more policies 48B, CAM 72 compares a query value against the one or more encoded values of CAM 72 and returns pointers to policies 48B associated with encoded values that match the query value. For instance, slave microprocessor 53 of PFE 58 may select one or more policies 48B from policy store 74 and may program forwarding ASICs 70 with the selected policies and process the packets according to the policies. Further details are of deployment of policies within a high-end router are described within U.S. patent application Ser. No. 12/947,463, entitled "POLICY AND CHARGING CONTROL RULE PRECEDENCE MAPPING IN WIRELESS CONTENT ACCESS NETWORKS," filed Nov. 16, 2010, and U.S. patent application Ser. No. 13/174,437, entitled "HYBRID PORT RANGE ENCODING" filed Jun. 30, 2011, the entire contents of both being hereby incorporated herein by reference.

In this way, components of control plane 44 and data plane 52 of router 20 provide mechanisms for automated deployment of a rich set of policies that provide fine-grain, flow-level control over packet flows associated with subscribers 8.

FIG. 3 is a block diagram illustrating example operation of the components of router 40. In the example of FIG. 3, the components of router 40 are arranged as operating within three different structural planes. In this example, the components of router 40 may be viewed as architecturally operating within data plane 52, service plane 72 and routing plane 75, where the routing plane and the service plane form a distributed version of control plane 44 shown in FIG. 2.

In the example of FIG. 3, flow control unit 57 receives an inbound packet 78 and selectively directs the packet along fast path 91 to forwarding ASICs 70 for immediate forwarding or along slow path 93 for additional analysis by service cards 71. That is, flow control unit 57 receives an incoming packet 78 for a packet flow (e.g., IP traffic or VPN-encapsulated traffic) and determines whether to send the packet to deep packet inspection (DPI) module 73 for processing within one or more of service cards 71, or whether to bypass DPI module 73. In one example, flow control unit 57 may maintain a flow table to track current packet flows. Upon receiving a packet that does not match a current packet flow, flow control unit 57 may direct the packet to service cards 71 for processing. In some cases, upon determining that a particular packet flow does not require additional processing, such as determining that the packet flow does not pose a threat, DPI module 73 may issue commands 65 to dynamically configure flow control unit 57 of data plane 52 to direct subsequent packets of the packet flow along fast path 91, thereby bypassing DPI module 73.

The term "packet flow" refers to a set of data packets originating from a particular source device and sent to a particular destination device as part of an application communication session between the source and destination device. More specifically, the terms "data stream", "data flow", and "packet flow" may be understood to indicate the same or similar concepts of a flow of packetized data, in accordance with a packet protocol such as IPv4, IPv6, X.25, or some other packet protocol. A flow of packets, in either the upstream direction (i.e. sourced by one of subscriber devices 18) or downstream direction (destined for one of subscriber devices 18), may be identified by the five-tuple: <source network address, destination network address, source port, destination port, protocol>. This five-tuple generally identifies a packet flow to which a received packet corresponds and, depending on the flow direction, one of subscriber devices 18 may be associated with either the source network address or the destination network address of the packet flow. For example, one of subscriber devices 18 may establish a subscriber session with one of GWs 28, 36 such that the subscriber session supports multiple application flows for corresponding applications. Each of the application flows has distinct quality of service (QoS) parameters that correspond with the service or application being carried over each of the bearer channels, such as VoIP or bulk data transfer, and with the subscriber information, e.g. levels of service in the SLA. Packet flows may therefore also be characterized and identified according to other characteristics, including VLAN tags, PPPoE session, and GTP tunnel identifiers of network layer or data link layer protocol headers/tags that encapsulate the packets.

In general, service cards 71 may be installed along a backplane or other interconnect of router 40 and, in one example, include DPI module 73 to perform a variety of services on the packets received from data plane 52, such as filtering, logging, Intrusion Detection and Prevention (IDP) analysis, virus scanning, deep packet inspection. That is, in general, DPI module 73 of service cards 71 receive packets from flow control unit 57, selectively provide security and other services to the packets in accordance policies installed by local policy engine 47, and relay packets or any response packets to data plane 52 for forwarding by forwarding ASICs 70 in accordance with HW FIB 54B.

In general, DPI module 73 identifies packet flows in the monitored traffic, and transparently reassembles application-layer communications from the packet flows. A set of protocol-specific decoders within the DPI module 73 analyzes the application-layer communications and identifies application-layer transactions. During this process, DPI module 73 discovers new packet flows associated with subscriber sessions and determines subscriber information for the data packets by, for example, determining an IP address or subscriber identifier from the packets. In some cases, DPI module 73 may determine that incoming packet 78 represents a request for a new subscriber session. In addition, DPI module 73 may apply DPI to the data packets to identify a type of software application, i.e., an application identity, for the subscriber packet flow. The application identity information may include an application identifier ("application ID") that DPI module 73 assigns to the application based on its inspection of the packets in the application flow. For example, DPI module 73 may determine that a packet flow is associated with a particular layer seven (L7) communication protocol including HyperText Transfer Protocol (HTTP), the File Transfer Protocol (FTP), the Network News Transfer Protocol (NNTP), the Simple Mail Transfer Protocol (SMTP), Telnet, Domain Name System (DNS), Gopher, Finger, the Post Office Protocol (POP), the Secure Socket Layer (SSL) protocol, the Lightweight Directory Access Protocol (LDAP), Secure Shell (SSH), Server Message Block (SMB) and other protocols. In some examples, DPI module 73 may detect and identify applications that use various means for transporting communications, e.g., either using layer four (L4), or the transport layer, as a transport means, or using another software application at layer seven (L7), or the application layer, as a transport means. That is, DPI module 73 may detect layered or stacked applications at L7 of a network. For example, DPI module 73 may detect and identify packet flows for Kazaa and Yahoo! Messenger (YMSG) protocols that use another L7 application, such as the HyperText Transfer Protocol (HTTP) or Microsoft's implementation of the Server Message Block (SMB) protocol, also known as the Common Internet File System (CIFS), as a transport layer-like application for transporting application data. Further example details of application identification that may be performed by DPI module 73 are described in U.S. Pat. No. 8,112,800, the entire contents of which are incorporated herein by reference.

DPI module 73 forwards this subscriber information and application identity information, collectively referred to as DPI output data 94, to policy control engine 85. In response, policy control engine 85 attempts to make local decision with respect to the new packet flow based on policies 48A. That is, policy control engine 85 searches policies 48A for a matching session policy to apply to the session for the subscriber packet flow based at least in part on the subscriber information and the application identity information received as DPI output data 94. The session policy may, for example, control configurable packet processing operations to be applied by forwarding ASICs 70, such as packet forwarding, bandwidth, quality of service, filtering, rate limiting, marking, accounting, dynamic-request change of authorization (CoA), policy-based routing and redirection, advertisement insertion, lawful intercept, class of service, and traffic shaping, for instance. As another example, a policy may specify a filter, classifier, class of service queue, counter, policer, lawful intercept component, traffic flow template, routing table, or mobility tunnel endpoint identifier handler, for example. The policy may also be associated with a PDP address allocated by the service provider network 20 for the subscriber device 18 for use in sending and receiving subscriber session data packets; routing information used by services cards 71 in directing the forwarding of session data packets, such as tunnel endpoint identifiers (TEIDs) and identifiers or addresses for downstream nodes; and session policy characteristics such as bandwidth, priority, quality of service (QoS) profiles, dynamic IGMP, firewall filter, and class of service (CoS) configuration, for each of the individual packet flows in the subscriber session, for example. Upon selecting one of local policies 48A for the particular packet flow, local policy engine 47 programs a copy of the policy within policies 48B within forwarding ASICs to be applied to subsequent packets of the packet flow for the particular subscriber 18.

In the event local policy engine 47 is unable to resolve the newly discovered packet flow to a particular one of policies 48A, the local policy engine communicates with policy server 37 to request a policy for the particular packet flow. However, instead of using a conventional protocol, such as Radius or Diameter, local policy engine 47 invokes SDN interface 68 to construct and output message 101 in accordance with a software defined networking (SDN) protocol as if data plane 52 were directly exposed to an external SDN controller or device. Moreover, upon receiving response message 103 in accordance with the SDN protocol, local policy engine 47 extracts the specified policy for the new packet flow and stores the policy within routing plane 75 along with other local policies 48A. Local policy engine 47 deploys the policy to policy store 74 for installation within forwarding ASICs 70. Moreover, local policy engine 47 may also output a response 96 that provides any packet flow-specific instructions for DPI module 73, including specification of any policies 48C to be applied in service plane 72 based on analysis of the packets. For example, DPI module 73 may subject subsequent packets of the packet flow to certain types of deep packet inspection and analysis operations, as specified by policies 48C, based on the instructions received from local policy engine 47. Alternatively, DPI module 73 may issue command 65 to direct flow control unit 57 to install a dynamic filter within the flow table, such as an exact match filter that indicates particular actions to be performed when a packet is received that matches the filter. In the case local policy engine 47 indicates by way of message 96 that no further DPI services need be applied to the packet flow (e.g., after determining that the packet flow is trusted or benign), DPI module 73 may install a filter within flow control unit 57 to specify that subsequent packets of this packet flow session may be processed on fast path 91 that bypasses DPI module 73.

In this way, routing plane 75 presents an SDN interface 68 as if data plane 52 were directly exposed for software defined networking, yet policy control decisions are nevertheless maintained by local policy engine 47 of routing plane 75 and packet flow detection and analysis functionality provided by flow control unit 57 and DPI module 73 are still utilized within router 40.

Figure 4A:
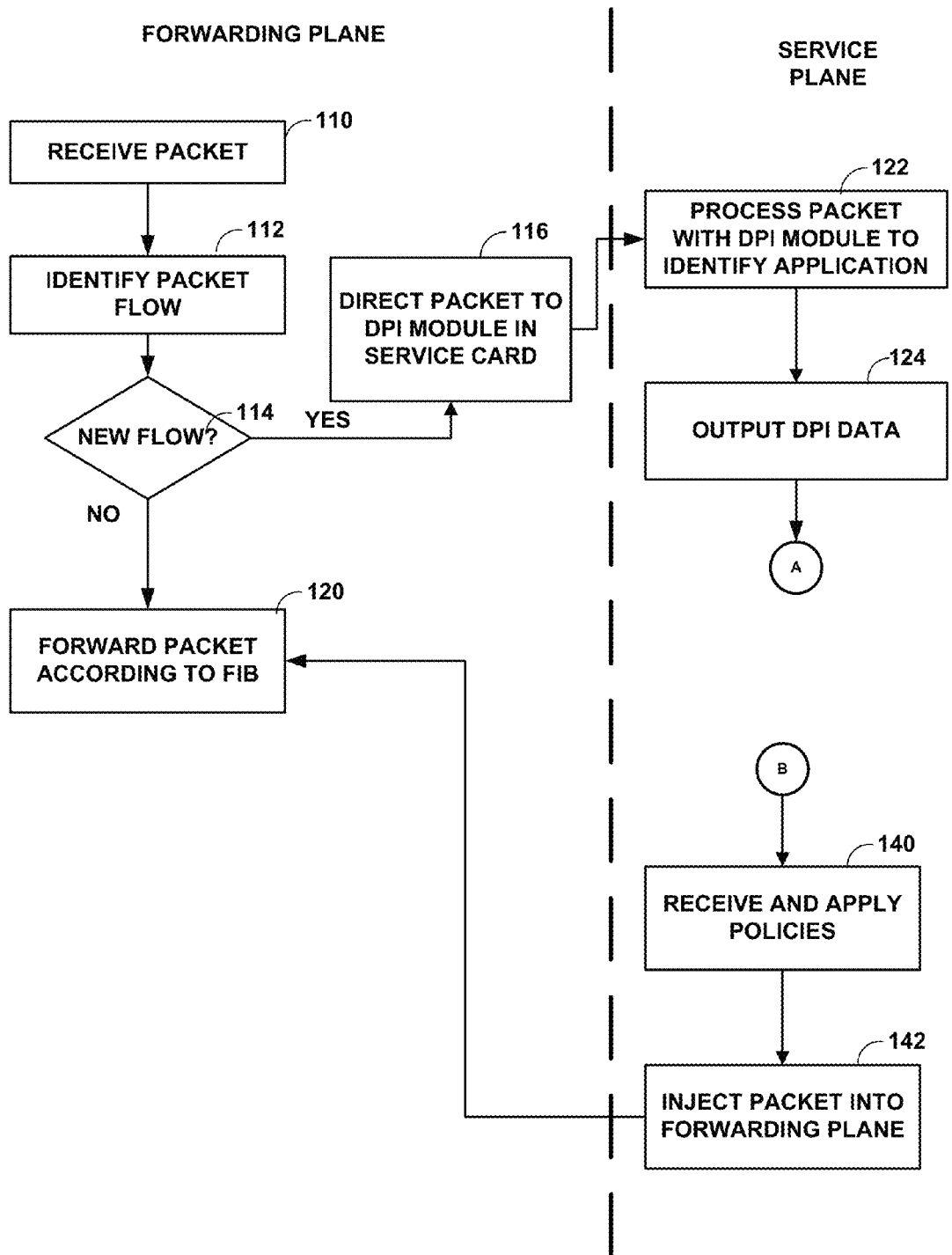
FIGS. 4A, 4B depict a flowchart illustrating example operation of router 40 of FIGS. 2-3 in accordance with aspects of this disclosure.
Figure 4B:
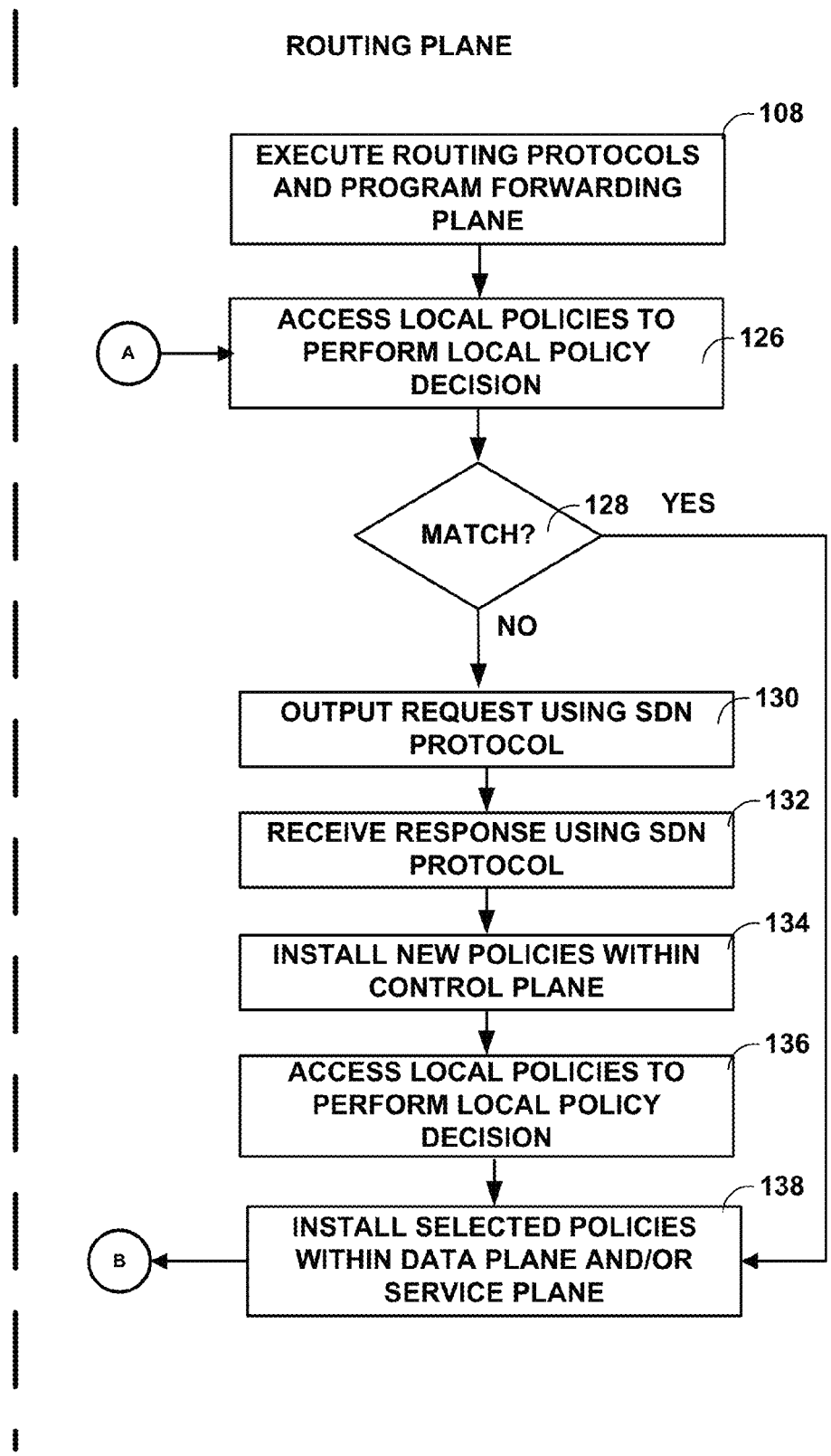

FIGS. 4A, 4B depict a flowchart illustrating example operation of router 40 of FIGS. 2-3 in accordance with aspects of this disclosure. Initially, as shown in FIG. 4B, routing engine 49 executes protocols 46 to learn and maintain routing information within RIB 50 representative of topology information (108). Routing engine 49 processes the routing information to select routes through the networks and generate forwarding information in accordance with the selected routes. In addition, routing engine 49 installs the forwarding information into forwarding integrated circuits 70 (108).

Subsequently, as shown in FIG. 4A, router 40 receives a packet, such as IP traffic or VPN traffic from a VPN tunnel (110). In one optional example, a flow control unit 57 of the data plane 52 analyzes the received packet to identify a packet flow associated with the packet (112), e.g., using a flow-based provisioning logic to identify a five-tuple based on information carried in the header or body of the packet. Upon identifying the packet flow, flow control unit 57 references an internal flow table to determine whether the packet belongs to a new packet flow or a packet flow already recognized by the router (114).

If flow control unit 57 finds a match in the flow table (YES branch of 114) for the received packet and the matching entry directs the packet onto fast path 91 for processing (YES branch of 94), flow control module 20 does not forward the packet to IDP 68 but signals forwarding ASICs 70 that the packet can immediately be forwarded in accordance with FIB (74).

If flow control unit 57 does not find a match in the flow table (NO branch of 114), which indicates that the packet belongs to a new packet flow, the flow control unit directs the packet to service cards 71 for deep packet inspection (116).

When the packet is directed to one of service cards 71, DPI module 73 of that service card applies deep packet inspection of the packet or series of packets for the packet flow (122). For example, DPI module 73 may extract and assemble application layer data from the packet to produce data indicative of an application identity associated with the new packet flow. DPI module 73 may also identify a subscriber for the packet flow, such as when the packet represents a session request. For new packet flows, DPI module 73 communicates the data to policy engine 47 of the control plane 44 (124). DPI module 73 may also perform Intrusion Detection and Prevention (IDP) analysis and/or virus scanning to filter out certain packets. As a further example, the DPI module 73 may perform ciphering, NAT or authentication services.

Upon receiving DPI data from DPI module 73 for new packet flows, policy engine 47 accessing policies 48A stored within the policy database of control plane 44 to attempt to identify one or more of the policies that specify criteria that match attributes of the new packet flow, as specified by the DPI data (126). In other words, policy engine 47 attempts to perform a local policy decision to select one of the policies from the policy database.

In the event the local policy decision operation identifies one or more policies specifying criteria, e.g., rules, that match data from DPI module 73 for the new packet flow (YES branch of 128), policy engine 47 may communicate the selected policies to DPI module 73 and/or may install the selected policies directly into forwarding integrated circuits 70 of the data plane of the router (138).

However, in the event the local policy decision operation fails to identify one or more policies specifying criteria, e.g., rules, that match data from DPI module 73 (NO branch of 128), policy engine 47 outputs a message to request a policy from policy server 37, where the message is constructed to conform to a software defined networking (SDN) protocol as if the data plane of the router were directly exposed to an external device by the SDN protocol (130).

Upon receiving a response message from policy server 37, where the response message conforms to the SDN protocol and specifies at least one new policy, policy engine 47 installs the new policy within the policy database of control plane 44 (134). Policy engine 47 then perform a local policy decision to select one of the policies from the policy database for application to the new flow (136). Policy engine 37 may communicate the selected policies to DPI module 73 and/or may install the selected policies directly into forwarding integrated circuits 70 of the data plane of the router (138).

DPI module 73 receives the selected policies and may apply the policies to the packet and possibly subsequent packets of the packet flow (140) and inject the packet into data plane 52 for forwarding by forwarding ASICs 70 in accordance with HW FIB 54B (142, 120). In some instances, DPI module 73 may signal flow control unit 57 and direct the flow control unit to install criteria in its internal flow table designating whether subsequent packets of the packet flow should be forwarded directly to forwarding integrated circuits 70 along fast path 91 or whether the subsequent packets should continue to be directed to DPI module 73 along slow path 93. At this time, DPI module 73 may determine whether to install the policies selected for the packet flow directly into forwarding integrated circuits 70 of the data plane of the router in the event subsequent packets for the flow need not be directed to DPI module 73.

Techniques described above leverage protocols for software defined networks (SDNs) yet utilize local policy control and to scale to the demand from increasing numbers of subscribers. As described, in various examples, a network device includes an internal policy engine that makes local policy decisions on a per-packet flow basis and controls policies applied by service modules and forwarding components of the network device to those flows. The policy engine interacts with external devices, such as an external policy server, to receive policies using software defined networking (SDN) protocol as if the data plane of the network device were directly exposed to the external policy server by the SDN protocol. In this way, the techniques provide a flexible, granular per-flow policy control framework.

The techniques may be applied in a variety of applications. For example, with the growing transition towards VoIP-based services and video calls, being able to identify VoIP or video flows (out of multiple flows belonging to same subscriber session) may be helpful in treating or prioritizing the flows efficiently from a network perspective. This techniques described herein may allow for dynamic service activation and policy application, thus removing any need to statically dedicate bandwidth for each subscriber/service. Moreover, a router or other network device can identify and report when a flow cannot be set up due to bandwidth constraints. In network congestion scenarios, premium flows can be offloaded or redirected onto less congested paths on the network by applying proactive policy control. This enables network operators to control the bandwidth usage in the network even at peak times.

As another example, the techniques may be applied in the context of an intelligent VPN service, which a service provider may offer to enterprise customers. In order to scale, provide quality of experience levels and meet service level agreements, the service provider can implement the VPN using policy delegation and intelligent local policy decisions with an SDN protocol as described herein. The deep packet inspection (DPI) function on the local device may discover and the local policy engine may report new customer flows via the SDN protocol, as described herein. An external policy controller for the VPN makes a decision to add the customer as a new VPN member based on interaction with the VPN service application within the network. This decision is communicated to the local policy engine using SDN, and the local policy engine within the network device now makes intelligent policy decisions with respect to resources, bandwidth management and prioritization of the flows currently being handled by the device. The local policy engine may determine not to honor the decision of the external policy controller due to a number of factors, such as lack of local resources within the network device. In such a case, the local policy engine may communicate this decision back to the external policy server again using the SDN protocol. When the flows stop, the local device can deallocate and recover the resources that were associated with the VPN member and inform the external controller of this set of events. Similarly, any change in flows belonging to the VPN member can be dealt with intelligently at the local device level and then communicated to the external controller via the SDN protocol.

Further, as described herein, a network device, such as a BRAS, may utilize the techniques described herein and delegate part of the policy enforcement to a downstream DSLAM, e.g., instructing the DSLAM to use certain parameter values for interleaving delay to manage subscriber flows. The interleaving delay may be different for the subscribers based on the various services that they access; interleaving delay directly affects the quality of experience (QoE).

Various embodiments of the invention have been described. These and other embodiments are within the scope of the following claims.

The invention claimed is:

1. A method comprising:
   detecting, with a flow control unit of a data plane within a network device, a new packet flow;
   accessing, with a policy engine of a control plane within the network device, a plurality of policies stored within a policy database within the control plane within the network device to determine whether one or more of the policies stored within the policy database within the control plane within the network device specify criteria that match attributes of the new packet flow;
   outputting, in response to failing to identify in the policy database within the control plane within the network device the one or more policies that specify criteria that match attributes of the new packet flow, a message from the control plane within the network device to a policy server external to the network device to request a policy from the policy server, wherein outputting the message comprises constructing the message with the control plane within the network device to conform to a software defined networking (SDN) protocol as if the data plane within the network device were directly exposed to an external device by the SDN protocol;
   receiving, with the control plane within the network device, a response message from the policy server, wherein the response message conforms to the SDN protocol and specifies at least one new policy; and
   installing the policy within the policy database within the control plane within the network device.

2. The method of claim 1, further comprising:
   after receiving the response message and installing the policy within the policy database within the control plane within the network device, executing a local policy decision with the policy engine of the control plane within the network device to select one of the policies from the policy database.

3. The method of claim 1, further comprising:
   installing at least one of the policies from the policy engine within the control plane into a forwarding integrated circuit of the data plane within the network device; and
   applying, with the forwarding integrated circuit, the selected policy to packets of the new packet flow.

4. The method of claim 3, further comprising:
   executing, with a routing engine within the control plane within the network device, at least one routing protocol to maintain routing information representative of topology information and to process the routing information to select routes through the networks and generate forwarding information in accordance with the selected routes;
   installing the forwarding information into the forwarding integrated circuit; and
   after applying the selected policy to the packets of the new packet flow, performing a forwarding operation on the packets with the forwarding integrated circuit.

5. The method of claim 1, further comprising:
   communicating at least one of the policies from the policy engine of the control plane to a deep packet inspection module within a service plane within the network device; and
   applying, with the deep packet inspection module, the selected policy to packets of the new packet flow.

6. The method of claim 1,
   upon detecting the new packet flow, forwarding one or more packets of the new packet flow from the flow control unit to a deep packet inspection module within a service plane of the network device;
   inspecting the one or more packets to produce data indicative of a subscriber and a software application identity associated with the new packet flow;
   communicating the data from the deep packet inspection module to the policy control engine of the control plane; and
   accessing, with the policy engine, the plurality of policies stored within the policy database of the control plane within the network device to identify the one or more of the policies based on the application identity information.

7. The method of claim 1, wherein the SDN protocol comprises a layer two (L2) protocol for providing direct access to a data plane by a network device.

8. The method of claim 1, wherein the SDN protocol comprises a protocol in conformance with an OpenFlow protocol specification.

9. The method of claim 1, wherein the SDN protocol is extended to be used as a fine-grain policy distribution mechanism capable of deploying and installing the policies within the policy database of the control plane within the network device on a per packet flow basis.

10. The method of claim 1, wherein the network device comprises a layer two (L2) switch.

11. A network device comprising:
    a plurality of interfaces configured to send and receive packets;
    a data plane within the network device to forward packets between the interfaces, wherein the data plane includes a flow control unit to detect a new packet flow associated with the packets; and a control plane within the network device comprising:

a routing engine to maintain routing information specifying routes through a network, wherein the routing engine processes the routing information to select routes through the networks and install forwarding information within the data plane in accordance with the selected routes to control forwarding of the packets; and a policy engine that stores a plurality of policies stored within a policy database, wherein, in response to detection of the new packet flow, the policy engine comprised in the control plane within the network device accesses the plurality of policies to determine whether one or more of the policies, stored within the policy database comprised in the control plane within the network device, specify criteria that match attributes of the new packet flow and, in response to failing to identify one or more policies that specify criteria that match attributes of the new packet flow stored within the policy database comprised in the control plane within the network device, outputs a message to request a policy from a policy server external to the network device, the message constructed to conform to a software defined networking (SDN) protocol, wherein the policy engine receives a response message from the policy server that conforms to the SDN protocol and specifies at least one new policy, and wherein the policy engine installs the policy within the policy database of the control plane within the network device.

12. The network device of claim 11, wherein the policy engine within the network device, after receiving the response message and installing the policy within the policy database within the network device, performs a policy decision to select one of the policies from the policy database.

13. The network device of claim 12, wherein the policy engine installs the selected policy into a forwarding integrated circuit of the data plane within the network device, and wherein the forwarding integrated circuit applies the selected policy to packets of the new packet flow and performs a forwarding operation on the packets in accordance with the forwarding information generated by the routing engine of the control plane.

14. The network device of claim 12, wherein the policy engine communicates the selected policy to a forwarding integrated circuit of the data plane within the network device, and wherein the deep packet inspection module applies the selected policy to packets of the new packet flow.

15. The network device of claim 11, wherein, upon detecting the new packet flow, the flow control unit forwards one or more packets of the new packet flow to a deep packet inspection module within a service plane within the network device, wherein the deep packet inspection module inspects the one or more packets to produce data indicative of a subscriber and a software application identity associated with the new packet flow and communicates the data to the policy control engine of the control plane; and wherein the policy engine accesses the plurality of policies stored within the policy database of the control plane within the network device to identify the one or more of the policies based on the application identity information.

16. The network device of claim 11, wherein the SDN protocol comprises a layer two (L2) protocol for providing direct access to a data plane by a network device.

17. The network device of claim 11, wherein the SDN comprises a protocol in conformance with an OpenFlow protocol specification.

18. The network device of claim 11, wherein the network device comprises a layer two (L2) switch.

19. A non-transitory computer-readable storage medium comprising instructions that cause a processor to:

access, with a policy engine positioned within a control plane within a network device, a plurality of policies stored within a policy database of the control plane within the network device to determine whether one or more of the policies stored within the policy database within the control plane within the network device specify criteria that match attributes of a new packet flow;

output, in response to failing to identify, with the policy engine, in the policy database within the control plane within the network device the one or more policies that specify criteria that match attributes of the new packet flow, a message from the control plan within the network device to request a policy from a policy server external to the network device, wherein the message is constructed to conform to a software defined networking (SDN) protocol as if the data plane within the network device were directly exposed to an external device by the SDN protocol;

receive, with the control plane within the network device, a response message from the policy server, wherein the response message conforms to the SDN protocol and specifies at least one new policy;

install the policy within the policy database within the control plane within the network device; and after receiving the response message and installing the policy within the policy database of the network device, executing a local policy decision with the policy engine within the network device to select one of the policies from the policy database for application to packets forwarded by the network device.

20. The non-transitory computer-readable storage medium of claim 19, comprising instructions such that the network device comprises a layer two (L2) switch.

* * * * *